(12) United States Patent
Brackhagen et al.

(10) Patent No.: US 8,569,401 B2
(45) Date of Patent: Oct. 29, 2013

(54) STORING AND DISTRIBUTING A FEEDER PRODUCT

(75) Inventors: Meinolf Brackhagen, Walsrode (DE); Marco Grossstueck, Walsrode (DE); Martin Kowollik, Bad Fallingbostel (DE); Hartwig Schlesiger, Burscheid (DE); Jan Zillmann, Bad Fallingbostel (DE)

(73) Assignee: Dow Global Technologies, LLC, Midland, MI (US)

( * ) Notice: Subject to any disclaimer, the term of this patent is extended or adjusted under 35 U.S.C. 154(b) by 99 days.

(21) Appl. No.: 13/124,546

(22) PCT Filed: Sep. 29, 2009

(86) PCT No.: PCT/EP2009/006997
§ 371 (c)(1),
(2), (4) Date: Jul. 13, 2011

(87) PCT Pub. No.: WO2010/043307
PCT Pub. Date: Apr. 22, 2010

(65) Prior Publication Data
US 2011/0281979 A1    Nov. 17, 2011

(30) Foreign Application Priority Data
Oct. 16, 2008 (EP) .................................... 08018119

(51) Int. Cl.
*C08L 1/26* (2006.01)
(52) U.S. Cl.
USPC ............................................. 524/43; 524/44
(58) Field of Classification Search
USPC .................................................. 524/43, 44
See application file for complete search history.

(56) References Cited

U.S. PATENT DOCUMENTS

| | | |
|---|---|---|
| 4,654,085 A | 3/1987 | Schinski |
| 5,945,495 A | 8/1999 | Daniel et al. |
| 6,509,461 B2 | 1/2003 | Schlesiger et al. |
| 7,012,139 B2 | 3/2006 | Schlesiger et al. |
| 7,425,593 B2 | 9/2008 | Grig et al. |
| 2004/0225035 A1 | 11/2004 | Schlesiger et al. |
| 2005/0282939 A1 | 12/2005 | Weber et al. |
| 2007/0019963 A1 | 1/2007 | Mizue |
| 2010/0292460 A1 | 11/2010 | Brackhagen et al. |

FOREIGN PATENT DOCUMENTS

| | | | |
|---|---|---|---|
| WO | WO 9964368 A1 | * | 12/1999 |
| WO | 2007090599 A1 | | 8/2007 |

OTHER PUBLICATIONS

"Batch-Type Ploughshare Mixers." WBHV Publication. Product Description. Downloaded Dec. 11, 2012.*
Bartelmus et al.; "Die Analytik von Celluloseathergruppen"; Z. Analytical Chemistry; 1977; 161-190; 286; English Abstract.

* cited by examiner

*Primary Examiner* — Liam Heincer
*Assistant Examiner* — Nicholas Hill

(57) ABSTRACT

The present invention relates to a process for the preparation of a water-moist cellulose ether composition, characterized in that water-soluble polymeric additives which contain anionic groups (WSAP), or corresponding additive mixtures, are added to the cellulose ether composition. The invention furthermore relates to water-moist cellulose ether compositions which can be prepared by such a process, and to corresponding milled and dried cellulose ether compositions. The invention also relates to the use of these WSAP or corresponding WSAP mixtures for improving the transportability of water-moist cellulose ether compositions in conveying units.

7 Claims, No Drawings

STORING AND DISTRIBUTING A FEEDER PRODUCT

CROSS REFERENCE TO RELATED APPLICATIONS

This application is a 35 USC §371 national phase filing of PCT/EP09/006997 filed Apr. 22, 2010, which claims the benefit of EP Application No. 08018119.1, filed Oct. 16, 2008.

The present invention relates to a process for the hold-up and distribution of a feedstock. In particular, the present invention relates to a process for the preparation of a water-moist cellulose ether composition. The invention furthermore relates to the water-moist cellulose ether compositions which can be prepared by such a process, and to corresponding milled and dried cellulose ether compositions.

Owing to their outstanding properties, cellulose ethers have a variety of applications, for example as thickeners, adhesives, binders and dispersants, water-retention agents, protective colloids and stabilizers and as suspending media, emulsifiers and film-formation agents.

It is generally known that cellulose ethers are prepared by alkaline digestion of cellulose and subsequent etherification with etherification reagents, such as, for example, methyl chloride, ethyl chloride, ethylene oxide, propylene oxide or chloroacetic acid. However, a product which can be used in industrial applications forms only after washing, compaction, milling and drying of the crude cellulose derivatives obtained after the reaction.

The compaction of the cellulose ethers often present in the form of wadding takes place industrially both by mechanical energy input and by addition of water. A combination of mechanical energy input and addition of water is also possible.

The mechanical energy input can be realized continuously or discontinuously, for example by granulators, kneaders, roll mills or by pressing. In most cases, water is mixed in before or during the mechanical energy input, in order to enhance the compacting effect of the mechanical forces. In many cases, the mechanical energy input can be reduced by addition of increased amounts of water. In addition, cooling is frequently effected during the mechanical energy input, for example by a cooled double jacket or passage of cooled air through or over the mixture. Moreover, the water to be added can be cooled or can be added completely or partly as ice.

In modern industrial processes for the production of cellulose derivatives, water-moist granules, water-moist lumps or a water-moist paste is or are therefore formed as an intermediate in most cases. Depending on cellulose derivative, the action of mechanical forces and the addition of water, these have varying consistencies, particle shapes and particle sizes. These water-moist granules, water-moist lumps and pastes of varying consistency, particle shape and particle size are summarized below as "feedstock" or as "water-moist cellulose ether composition".

The feedstock is dried and milled in subsequent process steps. Milling and drying can be carried out here stepwise or simultaneously. Thus, the desired dried and comminuted cellulose derivative product is obtained in the form of a grit, powder or fine powder.

The present-day throughputs of individual modern industrial plants for the production of cellulose derivatives are in general greater than 500 kg/h of prepared cellulose derivative products. Even throughputs greater than 1000 kg/h or even greater than 2000 kg/h are possible.

The throughputs of feedstock may be 5000 kg/h or more, depending on the moisture content of feedstock, for example for the case of a throughput of 1000 kg/h of cellulose derivative at a moisture content of 80%, based on the total mass of cellulose derivative and water.

For the case of the same throughput of 1000 kg/h of cellulose derivative at a moisture content of 50%, based on the total mass of cellulose derivative and water, a feedstock stream of only 2000 kg/h is achieved.

Owing to the different throughputs (due to different moisture contents of feedstock), it may be necessary temporarily to buffer the amounts of feedstock since the drying power of the downstream apparatuses are generally not designed for the peak throughput for economic reasons.

Depending on the water content, it is also necessary to provide different residence times for absorption of the water, for example by diffusion.

Moreover, the further processing of the feedstock generally takes place in a plurality of parallel mills and/or drying units.

Unfortunately, a feedstock containing water-moist cellulose derivatives is as a rule tacky and lumpy and has a very strong tendency to cake and to form very large lumps and to stick to container walls. Transport of such feedstocks is scarcely possible even with avoidance of residence times and is often no longer possible at all after residence times of a few minutes since the resulting lumps are of a size which can no longer be drawn in and moved by conveying units, such as conveying screws.

The person skilled in the art therefore avoids residence times or uses complicated, positively conveying units (e.g. extruders) or comminuting devices for comminuting large lumps (e.g. choppers), which lead to a high energy requirement and in some cases even to product damage.

Such a very complicated process for the use of kneaders or extruders is disclosed, for example, in EP 1 127 895.

Moreover, the person skilled in the art has to date as far as possible avoided the distribution of a feedstock having a high feedstock moisture content over a plurality of milling or drying trains or combined milling/drying trains, since uniform distribution and targeted metering are no longer possible owing to the tack of feedstocks.

The use of auxiliaries for milling or drying or combined milling and drying is likewise well known. Thus, surfactants are used as auxiliaries in the milling or drying step, for example in WO 2006/120194 or DE 196 01 763. However, the manner in which surfactants influence the residence behavior and distribution behavior of a feedstock is not described here.

In DE 196 01 763, surfactants are used as auxiliaries for the preparation of hydrophilic, highly swellable polymers. Inter alia, homo- and copolymers based on polymerizable acids, such as, for example, acrylic acid, methacrylic acid, vinylsulfonic acid or maleic acid, may be mentioned as hydrophilic, highly swellable polymers.

Moreover, surfactants are frequently ecologically questionable and have an irritant effect, so that their use is critical both with respect to occupational safety and with respect to use and transport of the products.

It was therefore an object of the present invention to provide an economically advantageous and ecologically and toxicologically improved process for the hold-up and optionally distribution of a feedstock, and corresponding cellulose ether compositions prepared by the process. A preferred object of the present invention was to provide such a process while avoiding comminuting tools, kneaders or extruders.

The present invention relates to a process for the preparation of a water-moist cellulose ether composition containing granular particles and/or lumps, comprising the steps a) provision of a starting material containing a water-moist cellulose ether or a cellulose ether mixture having a moisture content of from 25 to 75% by weight, preferably from 45 to 65% by weight, based on the total mass of the starting material, b) optionally addition and mixing in of water and/or optionally addition and mixing in of further additives, except for a water-soluble polymeric additive or additive mixture containing anionic groups (WSAP), to the starting material, characterized by the step c) addition of from 0.001 to 2.0% by weight, preferably from 0.1 to 1.0% by weight, more preferably from 0.2 to 0.8% by weight, of a water-soluble polymeric additive or additive mixture containing anionic groups (WSAP) or of a WSAP mixture, based on the dry mass of the cellulose ether composition to be prepared, to the composition obtained in step a) or in steps a) and b), so that a water-moist cellulose ether composition is obtained which has a moisture content of from 45 to 85% by weight, preferably from 50 to 80% by weight, more preferably from 55 to 75% by weight, based on the total mass of the cellulose ether composition.

Surprisingly, it has now been found that, even in low-speed apparatuses which are not positively conveying, the process according to the invention gives a feedstock which can be held up and distributed, and positively conveying units or comminuting devices, i.e. comminuting tools, kneaders or extruders, are no longer required.

Inter alia, the following may be mentioned here as economic advantages:

low energy requirement,
high availability, for example by reduction of downtimes for cleaning purposes,
low cost of apparatus.

Inter alia, the following may be mentioned here as ecological and toxicological advantages:

avoidance of unsafe additives which might be environmentally hazardous or have an irritant effect under certain circumstances,
avoidance of wastewaters, for example by reduction of cleaning wastewaters.

As explained above in the introductory part, a preferred, important aspect of the invention is that it is possible to provide a process for the distribution of a water-moist cellulose ether composition over at least two, preferably at least three, milling, drying or combined milling/drying plants, preferably by means of take-off screws, which is characterized in that a water-moist cellulose ether composition, in which WSAP or a WSAP mixture is inhomogeneously distributed, is distributed.

In a preferred embodiment of this process for the distribution, a water-moist cellulose ether composition as can be prepared by the above process described in detail below is distributed.

The process for the distribution of the moist cellulose ether composition makes it possible to increase the milling and drying power in the case of a given plant configuration in a simple manner and with low capital costs.

The moist cellulose ether composition is distinguished in particular in that, in the process for the distribution of the moist cellulose ether composition over the milling, drying or combined milling/drying plants, in general no units and/or tools downstream of the preparation of the moist cellulose ether composition and intended for comminuting large agglomerates or lumps are required;
no positively conveying units are required;
distribution containers are used for distributing the moist cellulose ether composition;
single conveyor screws or screw cascades of low drive power can be used for transporting the moist cellulose ether composition and/or
ecologically and toxicologically unsafe substances are avoided.

Tools for comminuting lumps and agglomerates are, for example, so-called milling heads which are typically operated at >1000 rpm. Distribution containers are preferably equipped with loosening mixing and scraping tools. The mixing shaft can be arranged horizontally and vertically.

The flow behavior is sufficient to enable simultaneous metering by means of a plurality of take-off screws, preferably by three take-off screws, to be realized. Alternatively, a cascade of distribution containers can be installed. For this purpose, two further distribution containers each having two take-off screws can be arranged, for example, below a distribution container having two take-off screws.

The distribution container can simultaneously be designed as a residence container. Cylindrical containers having low-speed mixing tools are preferably used as a distribution container which is simultaneously designed as a residence container. The ratio of the horizontal dimension of the container to the vertical dimension of the container is preferably greater than 1.5, particularly preferably greater than 2.0 and most preferably greater than 2.5.

Cylindrical containers having a vertically arranged shaft and flat bottom are preferably used. The cylindrical containers preferably have a loosening member in the form of a multiblade/multilevel stirrer, as described, for example, in WO2007/090599. Particularly preferably, the cylindrical shape has a conicity tapering slightly upward, so that the container corresponds to the lower section of a cone. Preferably, scraping/loosening members having a relief cone, particularly preferably in combination with a conicity tapering slightly upward, are used. Such containers with a discharge apparatus are available, for example, from J. Engelsmann, Ludwigshafen.

The functions of hold-up and distribution are preferably combined in one unit. In this case, the distribution preferably takes place over two, particularly preferably over three, milling or drying or combined milling/drying trains.

Preferably used cellulose ethers are methylcelluloses, hydroxyalkylcelluloses, carboxymethylcelluloses and derivatives thereof.

In the context of this invention, methylcellulose is understood as meaning all cellulose ethers containing methyl groups, such as methylcellulose (MC), methyl-hydroxyethylcellulose (MHEC), methylhydroxypropylcellulose (MHPC), methylhydroxyethylhydroxypropylcellulose, methylethylhydroxyethylcellulose and methyl-hydroxyethylhydroxybutylcellulose.

In the context of this invention, hydroxyalkylcelluloses are understood as meaning all cellulose ethers containing hydroxyalkyl groups, such as hydroxyethylcellulose, hydroxypropylcellulose, ethylhydroxyethylcellulose and hydrophobically modified hydroxyethylcellulose.

In the context of this invention, carboxymethylcelluloses are understood as meaning all cellulose derivatives containing carboxymethyl groups, such as carboxymethylcellulose, hydrophobically modified carboxymethylcellulose and hydroxyethylcarboxymethylcellulose.

The degree of the alkyl substitution of a cellulose ether is described as a rule by the DS (degree of substitution). The DS is the average number of substituted OH groups per anhydroglucose unit (AGU). The methyl substitution is stated, for example, as DS (methyl) or DS (M). Usually, the degree of the hydroxyalkyl substitution is described by the MS (molar substitution). The MS is the average number of moles of the etherification reagent which are bound by an ether bond per mole of anhydroglucose unit. The etherification with the etherification reagent ethylene oxide is stated, for example, as MS (hydroxyethyl) or MS (HE). The etherification with the etherification reagent propylene oxide is accordingly stated as MS (hydroxypropyl) or MS (HP).

The determination of the side groups is effected on the basis of the Zeisel method (literature: G. Bartelmus and R. Ketterer, Z. Anal. Chem. 286 (1977) 161-190).

Hydroxyalkylcelluloses or methylcellulose or methyl-hydroxyalkylcellulose are particularly preferably used. Hydroxyethylcellulose, methylhydroxyethylcellulose and methylhydroxypropylcellulose are most preferred.

In the case of the methylhydroxyalkylcelluloses, the DS (methyl) is preferably from 0.9 to 3.0, particularly preferably from 1.1 to 1.8 and in particular from 1.3 to 1.6. The MS (hydroxyalkyl) is preferably from 0.05 to 1, particularly preferably from 0.10 to 0.7 and in particular from 0.15 to 0.35. The methylhydroxyalkylcelluloses have the preferred ranges of DS (methyl) and of MS (hydroxyalkyl) advantageously in combination.

In the case of the hydroxyethylcelluloses, the MS (hydroxyethyl) is in general from 1.5 to 5.0, preferably from 2.0 to 4.5, particularly preferably from 2.5 to 4.0, most preferably from 2.8 to 3.7.

After the washing and filtration, the cellulose ethers, which are typically obtained in the preparation as water-moist filter cakes or by treatment of alcohol-moist filter cakes and are referred to above as "starting material", have a moisture content of from 25 to 75% by weight, based on the total mass of the starting material. Those water-moist cellulose ethers or cellulose ether mixtures which have a moisture content of from 45 to 65% by weight are preferably used in process step a) as starting material for the subsequent process steps. These cellulose ethers may usually contain other constituents, such as, for example, NaCl and further byproducts from the preparation, in an amount of up to 10% by weight, based on the dry starting material. The content of pure cellulose ether or cellulose ether mixture in the starting material may therefore be in the range from 90 to 100% by weight, based on the dry starting material.

From 88 to 99.999% by weight, based on the dry mass of the inhomogeneous cellulose ether composition to be prepared, are provided by the starting material in process step a).

In the process according to the invention, water-moist cellulose ethers, as are present, for example, after the washing of crude cellulose ethers, are brought to a moisture content ideal for the subsequent process steps, optionally with addition of water with mixing.

The addition of water and the mixing in of the water can be effected in process step b) in units according to the prior art. Here, for example, continuously operating granulators from Lödige Process Technology (Germany), with or without a weir, or continuously operating kneaders, for example from List AG, Arisdorf, Switzerland, or high-speed intensive mixers from Hosokawa Micron BV, Doetinchem, Holland, which are sold under the Schugi trademark, or corotating or counterrotating twin-screw units or ribbon mixers having a horizontally or vertically arranged mixing shaft and tools can be used.

It is known to the person skilled in the art that additives can be mixed in this moistening and mixing step b). These additives are used as a rule in an amount of from 0.01 to 10% by weight, preferably from 0.1 to 5% by weight, particularly preferably from 0.2 to 3% by weight, based in each case on the dry mass of the inhomogeneous cellulose ether composition to be prepared.

For example, glyoxal and buffer systems that are described in EP 1 316 536 or EP 1 452 544 may be mentioned here as additives.

WO 2007/019963, EP 1 313 770 and DE 103 52 081 describe the homogeneous addition of crosslinked and uncrosslinked polymeric additives. These additives are used for modifying the product properties and performance characteristics and are said to be sufficiently distributed in the feedstock and subsequent product.

Additives in step b) may be: oxidizing agents, such as hydrogen peroxide, ozone, hypohalides, perborates or percarbonates; dialdehydes, such as glyoxal and glutyraldehyde, salts, such as alkali metal phosphates, sulfates and chlorides; buffer systems, such as phosphate, citrate and borate buffer; crosslinking agents, such as polyfunctional epoxides and polyfunctional isocyanates; preservatives, dispersants, antifoams, air-entraining agents, pigments, nonionic, anionic and cationic surfactants.

The feedstock thus obtained is lumpy, superficially moist and tacky after mixing in of the water and any additives and can be kept transportable only by continuous commination with high-speed mixing tools. Distribution and metering are not possible.

Surprisingly, it has now been found that, in a process step c), the feedstock is positively influenced by addition of water-soluble polymeric additives or additive mixtures which contain anionic groups, in such a way that the hold-up and optionally distribution in residence and/or distribution containers is permitted. Water-soluble polymeric additives which contain anionic groups are abbreviated below in the context of this invention as WSAP (water soluble anionic polymers).

It is possible in this way to achieve average residence times greater than 5 minutes, preferably greater than 8 minutes, most preferably of from 10 to 30 minutes, without formation of large lumps which can no longer be conveyed in conveyor screws.

Continuously operating residence and distribution containers are preferably used. In this case, feedstock is transported continuously from above into the container while held-up feedstock is continuously taken off at the bottom of the container, for example by conveyor screws.

The addition of the WSAP can take place both upstream of the residence container and in the residence container; preferably, the addition is carried out shortly before or after the transfer point.

The amount of WSAP used in step c) is from 0.001 to 2.0% by weight, based on the dry mass of the cellulose ether composition to be prepared. From 0.1 to 1.0% by weight is preferably used. From 0.2 to 0.8% by weight is particularly preferably used. From 0.3 to 0.6% by weight is most preferably used.

Here, the WSAP should be added as an aqueous solution or in powder form. The WSAP is preferably added as an aqueous solution. Here, the WSAP concentration of the aqueous solution is as a rule from 0.5 to 20% by weight, based on the total weight of the solution. The concentration is preferably from 1 to 10% by weight. The concentration is particularly preferably from 2 to 7% by weight.

The water-moist cellulose ether composition obtained in this manner in step c) has a moisture content of from 45 to 85%, preferably from 50 to 80%, particularly preferably from 55 to 75% and most preferably from 60 to 72%, based on the total mass of the inhomogeneous water-moist cellulose ether composition.

The WSAP or the WSAP mixture is preferably applied superficially to the feedstock. Incorporation of the WSAP or of the WSAP mixture into the granular particles or lumps of the moist cellulose ether composition is undesired. Examples of unsuitable units which might incorporate the WSAP or the WSAP mixture in the granular particles or lumps of the moist cellulose ether composition in an undesirable manner are kneaders and extruders.

On the other hand, for example, turbulent mixers or ribbon mixers can advantageously be used. Cabinet mixers are preferably used. The mixing member may contain milling heads in order, for example, to break up existing lumps, if required, even before the WSAP addition.

WSAP used are, for example, water-soluble homo- and copolymers based on maleic acid, acrylic acid and methacrylic acid, vinylsulfonic acid, vinylphosphonic acid, styrenesulfonic acid, 2-(methy)acrylamide-2-methylpropanesulfonic acid, 2-(methy)acryloylethanesulfonic acid, 2-(methy)acryloylpropanesulfonic acid and the salts and esters thereof. For example, copolymers of said acids with the following monomers can be used: acrylamide, vinyl acetate and vinyl alcohol. Examples of these are: polyacrylates, partly hydrolyzed polyacrylamides, acrylamide-acrylic acid copolymers, polyaspartic acid and acrylic acid-methycrylate copolymers.

Surprisingly, polymers which themselves require the introduction of additives according to DE 196 01 763 in their preparation can be used as additives. Anionic polyacrylamides having an acrylate content, in particular having a sodium acrylate content, of less than 20% by weight and having a viscosity (1% strength by weight in 10% strength by weight sodium chloride solution, 25° C., measured using a Brookfield viscometer) of less than 1000 mPa·s are preferably used.

Optionally, further components are added in step c). Inter alia, pulverulent cellulose derivatives which are obtained in the optionally subsequent process described below for the preparation of a milled and dried cellulose ether composition after sieving or classification may be mentioned here. For example, powdered fractions which do not have the particle size required for use can be recycled to the process in this manner.

In a preferred embodiment of the process according to the invention, at no time are starch, starch ether, guar, guar ether and xanthan added to the water-moist cellulose ether or cellulose ether mixture or to the inhomogeneous water-moist cellulose ether composition, at least in any case not in an amount of from 0.1 to 10% by weight, based on the dry cellulose ether or cellulose ether mixture.

In the usually subsequent process for the preparation of a milled and dried cellulose ether composition, the WSAP-containing water-moist cellulose ether composition is dried and milled, it also being possible for the milling and drying to take place in one step (combined milling/drying). The drying and milling or combined milling/drying are or is carried out here by methods according to the prior art. The milling and drying is preferably carried out in combination in one step. Optionally, further milling steps according to the prior art may follow in order to achieve further comminution of the products.

The above-described process according to the invention gives a water-moist cellulose ether composition containing a) from 15 to 55% by weight, preferably from 20 to 50% by weight, more preferably from 25 to 45% by weight, of a dry mass containing i) from 79.2 to 99.999% by weight of a cellulose ether or of a cellulose ether mixture, based on the dry mass of the cellulose ether composition, ii) from 0.001 to 2.0% by weight, preferably from 0.1 to 1.0% by weight, more preferably from 0.2 to 0.8% by weight, of a water-soluble polymeric additive or additive mixture containing anionic groups (WSAP), based on the dry mass of the cellulose ether composition, iii) optionally up to 10% by weight, preferably from 0.1 to 5% by weight, particularly preferably from 0.2 to 3% by weight, of further additives, based on the dry mass of the cellulose ether composition, iv) optionally up to 8.8% by weight of other constituents, based on the dry mass of the cellulose ether composition, and b) from 45 to 85% by weight, preferably from 50 to 80% by weight, more preferably from 55 to 75% by weight, of water, characterized in that the WSAP or WSAP mixture is distributed inhomogeneously in the water-moist cellulose ether composition, namely between the granular particles and/or lumps of the inhomogeneous water-moist cellulose ether composition or on the respective surface thereof, less than 50% of the WSAP present in the composition being present within the granular particles and/or lumps.

In a preferred embodiment, in the water-moist composition according to the invention, less than 40%, preferably less than 30%, of the WSAP present in the composition are present within the granular particles and/or lumps. Whether the WSAP is present in the particles can be determined from cross sections through the particles. Sections of about 10-1000 nm thickness can be prepared by means of a microtome, for example Ultra Cut E (Reichert-Jung), for example after embedding in an epoxy resin. The person skilled in the art can find suitable preparation conditions by simple experiments.

The distribution of the WSAP or WSAP mixture can be determined, for example, by means of TEM-EDX or TEM-EELS if foreign atoms, for example nitrogen, are present in the WSAP (TEM=transmission electron microscopy; EDX=energy dispersive X-ray spectroscopy; EELS=electron energy loss spectroscopy).

Furthermore, thin sections of particles embedded according to the prior art can be stained with a cationically charged fluorescent marker. The distribution of the cationic fluorescent marker, for example propidinium bromide (from Invitrogen), reflects the distribution of the WSAP and can be detected by means of fluorescence spectroscopy. The staining conditions must be chosen so that the WSAP and other constituents of the particle do not dissolve.

A preferred method is secondary ion mass spectrometry. There, a primary beam ($O_2+$, O−, Ar+ or Cs+) is focused with a minimum diameter of about 2 µm onto the sample. The resulting secondary ions provide positionally resolved information about the composition in the region investigated. The removal of the surface layer by the primary beam gives a depth of profile without complicated sample preparation for the preparation of thin sections being required.

The cellulose ether products thus obtained are preferably used as additives in tile adhesives, renders, such as cement or gypsum render, filling compounds, dispersion systems, such as emulsion paints or dispersion adhesives, in cementitious systems which are extruded and in other building materials.

In order to adapt the cellulose ether products for use in specific building material systems, further addition of pulverulent additives can optionally be carried out, as described, for example, in U.S. Pat. No. 4,654,085.

EXAMPLES

Unless stated otherwise, the viscosities of the methyl-hydroxyethylcelluloses and methylhydroxypropylcelluloses were measured on solutions of the dry cellulose ethers in water at 20° C. and with a shear gradient of 2.55 s$^{-1}$ (measuring apparatus: Haake Rotovisko VT 550).

Example 1

Comparison 2.66 kg of a water-moist MHEC (water content 64% by weight, viscosity of a 2% strength by weight solution 40 000 mPa·s, DS(methyl) 1.35-1.40, MS (hydroxyethyl) 0.15-0.20) are moistened with water to a water content of 75.5% by weight and stirred for 10 minutes in a ribbon mixer having a horizontal shaft and a 5 liter capacity.

The product is transferred to a mixer having a vertical mixing shaft and slowly rotating milling tools and stirred for a further 20 minutes. The hold up capacity is assessed on the basis of the product fraction which adheres to the wall. The distribution capacity is assessed on the basis of the size of the granular particles and the nature of the surface.

Example 2

Invention

In a further experiment (experiment 2), a 3.5% by weight solution of polyacrylamide (PAAm) having a viscosity of 18 060 mPa·s at a shear rate of 2.55 s$^{-1}$ (Haake Rotovisko) is used after stirring for 9 minutes analogously to experiment 1 in the mixer having a horizontal mixing shaft, which polyacrylamide has a proportion of about 5% of anions. The amount of polyacrylamide used, based on the dry cellulose ether, is 0.4% by weight, based on the dry mass of the cellulose ether composition to be prepared. The product from experiment 2 is also stirred for 20 minutes in the residence container from experiment 1 at the same speed.

TABLE 1

|  | Experiment 1 (comparison) | Experiment 2 (invention) |
| --- | --- | --- |
| Polyacrylamide, % by weight based on dry cellulose ether | 0 | 0.4 (addition 9 min) |
| Discharge from mixer 1 (after mixing time of 10 minutes) | Difficult, 6 large lumps, 3 thereof adhere to the wall and to the mixing tool | Up to PAAm addition analogous to experiment 1, thereafter the large lumps disintegrate into a plurality of lumps which are wetted with PAAm solution and no longer adhere to the wall. |
| Discharge from the residence container (after a residence time of 20 minutes) | Many tacky medium-sized lumps, some of which agglomerate and adhere to the wall. | Scarcely any product sticks to the wall, substantially less than in experiment 1. Medium-sized lumps have formed, which are not tacky on the surface and do not tend to agglomerate. |

Example 3

Comparison

In example 3, a water-moist MHEC filter product having a moisture content of 56.09% by weight is used (viscosity of 2% strength by weight solution 9150 mPa·s, DS(methyl) 1.79, MS (hydroxyethyl) 0.14). The MHEC is mixed with water in a mixer having a horizontal shaft and is moistened to a water content of 69.23% by weight. After the water was added, mixing is effected for 10 minutes.

The moist cellulose ether is now transferred to a mixer having a vertically arranged mixing shaft and slowly rotating milling tools. The manner in which the cellulose ether can be discharged after a residence time of a further 10 minutes in the unit with the vertical mixing shaft (residence container) or whether the product discharge is hindered by sticking to the wall is assessed. Furthermore, the proportion of the product which passes through a perforated metal sheet having openings of 1 cm after the product was dried is measured.

Example 4

The procedure is analogous to example 3, a 5.85% strength by weight solution of the polyacrylamide used in example 2 being added to the mixer having a horizontal mixing shaft immediately after the water. The amount of the polyacrylamide is 0.4% by weight, based on the dry mass of the cellulose ether composition to be prepared.

Example 5

Analogous to example 4, the polyacrylamide solution being added after a mixing time of 9 minutes.

Examples 6 and 7

Analogous to examples 4 and 5, but a polyacrylamide solution of 3.5% by weight is used.

| Experiment | Water content, % by weight* | Polyacrylamide, % by weight* | Time of addition of PAAm, after min. | Sticking to the wall | Passage through 1 cm perforated metal sheet**, % by weight |
| --- | --- | --- | --- | --- | --- |
| 3 | 69.23 | 0 | — | yes | 60 |
| 4 | 69.23 | 0.4 | 0 | no | 88 |
| 5 | 69.23 | 0.4 | 9 | scarcely | 70 |
| 6 | 69.23 | 0.4 | 0 | scarcely | 70 |
| 7 | 69.23 | 0.4 | 9 | scarcely | 65 |

*based on the dry mass of the cellulose ether composition to be prepared
**discharge from the residence container (after a residence time of 10 minutes) and subsequent drying, the perforated metal sheet has punched-out squares having an edge length of 1 cm

Examples 8 to 12

In example 8, the procedure is analogous to examples 3, a different starting material being used. This is a water-moist MHEC filter product having a moisture content of 61.79% by weight used (viscosity of a 2% strength by weight solution 35-45 000 mPa·s, DS(methyl) 1.35-1.40, MS (hydroxyethyl) 0.13-0.20). The MHEC is mixed with water in a mixer having a horizontal shaft and is moistened to a water content of 69.23% by weight. After the water was added, mixing is effected for 10 minutes. Whether the product adheres to walls and shaft is assessed.

The moist cellulose ether is then transferred to a mixer having a vertically arranged mixing shaft and slowly rotating milling tools. The manner in which the cellulose ether can be discharged after a residence time of a further 10 minutes in the unit with the vertical mixing shaft (residence container) or whether the product discharge is hindered by sticking to the wall is assessed. Furthermore, the proportion of the product which passes through a perforated metal sheet having openings of 1 cm is measured (in contrast to example 3, measurement was effected on the moist product).

Example 9

The procedure is analogous to example 8, a 5.5% strength by weight solution of the polyacrylamide used in example 2 being added to the mixer having the horizontal mixing shaft immediately after the water. The amount of polyacrylamide is 0.4% by weight, based on the dry mass of the cellulose ether composition to be prepared.

Example 10

Analogous to example 9, the polyacrylamide solution being added after a mixing time of 9 minutes.

Examples 11 and 12

Analogous to examples 9 and 10, but a polyacrylamide solution of 3.5% by weight is used.

| Experiment | Water content, % by wt. * | Polyacrylamide, % by wt. * | Time of addition of PAAm, after min. | Sticking in the mixer (on discharge) | Sticking in the residence container (on discharge) | Passage through 1 cm perforated metal sheet **, % by wt. |
|---|---|---|---|---|---|---|
| 8 | 69.23 | 0 | — | yes wall, shaft | no | 15 |
| 9 | 69.23 | 0.4 | 0 | yes wall | yes | 33 |
| 10 | 69.23 | 0.4 | 9 | no | no | 5 |
| 11 | 69.23 | 0.4 | 0 | yes wall | yes | 51 |
| 12 | 69.23 | 0.4 | 9 | no | no | 4 |

* based on the dry mass of the cellulose ether composition to be prepared,
** on discharge from the residence container (after a residence time of 10 minutes), the perforated metal sheet has punched-out squares having an edge length of 1 cm

The invention claimed is:

1. A process for improving the transportability of a water-moist cellulose ether composition in a conveying unit, comprising the steps:
   a) provision of a starting material comprising a water-moist cellulose ether or a cellulose ether mixture having a moisture content of from 25 to 75% by weight, based on the total mass of the starting material,
   b) optionally addition and mixing in of water and/or optionally addition and mixing in of further additives, (except for WSAP), to the starting material, provided starch, starch ether, guar, guar ether and xanthan are not added, and are not present in the water-moist cellulose ether composition, characterized by the step
   c) surface addition of from 0.001 to 2.0% by weight, of a WSAP or of a WSAP mixture, based on the dry mass of the cellulose ether composition to be prepared, to granular particles and/or lumps of the composition obtained in step a) or in steps a) and b), followed by mixing the water-moist cellulose ether composition for a residence time of greater than 8 minutes, provided that the WSAP or WSAP mixture is distributed inhomogeneously in the obtained water-moist cellulose ether composition, namely, in the absence of kneaders or extruders, characterized in that less than 30% of the WSAP present in the obtained water-moist cellulose ether composition is found within the granular particles and/or lumps;
   so that a water-moist cellulose ether composition is obtained which has a moisture content of from 45 to 85% by weight, based on the total mass of the cellulose ether composition.

2. A process as claimed in claim 1, comprising the further steps of
   d) drying the water-moist cellulose ether composition,
   e) then milling, or combining steps d) and e) to take place in one step as combined milling/drying, and
   f) optional to further milling steps.

3. The process of claim 1, wherein the water-moist cellulose ether composition is distributed over at least two milling, drying or combined milling/drying plants.

4. The process of claim 1, wherein the conveying unit is a conveying screw.

5. The process of claim 1, wherein the WSAP or the WSAP mixture is selected from the group consisting of water-soluble homo- and copolymers based on maleic acid, acrylic acid, methacrylic acid, vinylsulfonic acid, vinylphosphonic acid, styrenesulfonic acid, 2-(methy)acrylamide-2-methylpropanesulfonic acid, 2-(methy)acryloylethanesulfonic acid, 2-(methy)-acryloylpropanesulfonic acid and the salts and esters thereof, including copolymers of said acids with monomers from the group consisting of acrylamide, vinyl acetate and vinyl alcohol.

6. The process of claim 1, wherein the WSAP is an anionic polyacrylamide having an acrylate content of less than 20% by weight and having a viscosity of less than 1000 mPa·s, measured at a concentration of 1% by weight in 10% strength by weight sodium chloride solution at 25° C.

7. The process of claim 1, wherein the cellulose ether derivative or derivatives are selected from the group consisting of methylcelluloses, hydroxyalkylcelluloses, carboxymethylcelluloses and derivatives thereof.

* * * * *